Patented Dec. 5, 1922.

1,437,641

UNITED STATES PATENT OFFICE.

GUSTAVE FERRIÈRE AND SIEGFRIED PFYFFER, OF ZURICH, SWITZERLAND; SAID FERRIÈRE ASSIGNOR TO SAID PFYFFER.

SOLDER FOR ALUMINUM AND ITS ALLOYS.

No Drawing. Application filed September 11, 1919. Serial No. 323,218.

*To all whom it may concern:*

Be it known that we, GUSTAVE FERRIÈRE, a citizen of the Republic of Switzerland, residing at Zurich, Auf der Mauer 13, Switzerland, and SIEGFRIED PFYFFER, a citizen of the Republic of Switzerland, residing at Zurich, Bahnhofplatz 2, Switzerland, have invented certain new and useful Improvements in Solders for Aluminum and Its Alloys; and we do hereby declare the following to be a clear, full, and exact description of the invention, such as will enable others skilled in the art to which it appertains to make and use the same.

Solders for aluminum, which do not require the employment of any blowing or soldering flame and which are adapted to be applied solely by means of a soldering iron or bit, are already known. A known solder of this kind contains for instance 60% tin, and moreover silver, copper, aluminum, lead, zinc, cadmium and antimony.

It has now been found by experience that a solder not necessitating the employment of a soldering flame can be obtained in a much simpler manner and with a much smaller number of constituent parts and containing in the simplest case only two metals, viz., tin and silver or tin and zinc, by providing in this solder a content of tin of at least 63%. Each of the two cited metals zinc and silver has the property of imparting to the alloy the required adherence that it has to possess.

In order to increase the mechanical resistance of the solder, preferably a certain percentage of copper can be added to the alloy when the latter contains tin and silver, or a certain percentage of copper and lead, or of copper and silver may be added when the solder contains only tin and zinc. The lead and the silver have the effect to produce in this case a perfect alloy, whilst copper alone does not mix properly with the tin.

In order to increase the fluidity of the solder, a certain percentage of cadmium or bismuth may be added to the alloy.

Thus, the improved solder contains at least two and at the outmost four metals. The novel solder presents the considerable advantage that no fusing agent or flux has to be used in connection with it and that the surfaces to be soldered have not to be specially prepared in advance, which is not the case with regard to the greatest part of the solders hitherto proposed. Upon a simple mechanical or chemical cleaning, quite a perfect adherence of the solder will be obtained.

The novel solder may also be used for alloys of aluminum, such as for instance duralumin.

Of the two metals causing the solder to adhere the silver must be chosen when the solder is used for soldering pieces through which flows an electric current, vessels serving for boiling ordinary or distillated water.

A solder consisting for example of tin 86%, copper 0.5–13.5%, silver 0.5–13.5%, is particularly well adapted to be used for soldering electric conductors, as such a solder offers a great resistance to any detrimental influence of the electric current upon it.

A very durable solder is for instance the following one: tin 72–87%, zinc 10–25%, lead 0.5–2.5%, copper 0.5–2.5%.

As no lead can be used in connection with cooking vessels, a solder consisting for instance of tin 85–95%, zinc 0.5–9.5%, silver 0.5–4.5%, copper 0.5–4.5% may be used for soldering such vessels.

For very cheap articles a solder containing tin 65–90%, zinc 10–35% may be used.

In certain instances a very fluid solder is required, for instance when preserve-tins and the like have to be closed in an airtight manner. When the colour of the solder is of no importance, an alloy consisting of tin 92%, silver 0.5–7.5%, bismuth 0.5–7.5% may be used.

When, on the other hand, the solder has to have a colour similar to that of aluminum, it may consist for instance of tin 63–78%, zinc 20–25%, cadmium 0.5–14.5%.

We claim:

A solder for aluminum and its alloys, consisting of four metals in the following proportions: 85–95% of tin, 0.5–9.5% of zinc, 0.5–4.5% of silver and 0.5–4.5% of copper.

In testimony that we claim the foregoing as our invention, we have signed our names.

GUSTAVE FERRIÈRE.
SIEGFRIED PFYFFER.

Witnesses:
EUGEN S. HELLERS,
JEAN SCHAAD.